United States Patent
Martinez

(10) Patent No.: US 10,201,155 B2
(45) Date of Patent: Feb. 12, 2019

(54) MECHANIZED TROLLING DEVICE

(71) Applicant: Larry D. Martinez, Arvada, CO (US)

(72) Inventor: Larry D. Martinez, Arvada, CO (US)

(73) Assignee: Troller Pro, Inc., Arvada, CO (US)

( * ) Notice: Subject to any disclaimer, the term of this patent is extended or adjusted under 35 U.S.C. 154(b) by 380 days.

(21) Appl. No.: 13/840,148

(22) Filed: Mar. 15, 2013

(65) Prior Publication Data

US 2014/0259863 A1 Sep. 18, 2014

(51) Int. Cl.
| | | |
|---|---|---|
| *A01K 91/02* | (2006.01) | |
| *A01K 97/00* | (2006.01) | |
| *A63H 23/00* | (2006.01) | |
| *A63H 23/04* | (2006.01) | |
| *B63G 8/00* | (2006.01) | |

(52) U.S. Cl.
CPC .............. *A01K 91/02* (2013.01); *A01K 97/00* (2013.01); *A63H 23/00* (2013.01); *A63H 23/04* (2013.01); *B63G 8/00* (2013.01); *B63G 2008/004* (2013.01)

(58) Field of Classification Search
CPC ........ A01K 97/00; A01K 91/02; A01K 99/00; A63H 23/00; A63H 23/04; A63H 23/06; B63G 8/00; B63G 8/001; B63G 2008/005; B63G 2008/002; B63G 2008/004; B63G 8/08
USPC .... 43/26.1, 26.2, 4; 446/153, 154, 160, 161, 446/162, 163, 165; 114/255, 312, 315, 114/326, 337, 338
See application file for complete search history.

(56) References Cited

U.S. PATENT DOCUMENTS

| | | | | | |
|---|---|---|---|---|---|
| 2,726,471 | A | * | 12/1955 | Uus ....................... | A01K 91/065 43/26.1 |
| 2,990,797 | A | * | 7/1961 | Moeller .................. | F01P 3/207 114/183 R |
| 3,034,467 | A | * | 5/1962 | Pestronk ................ | A63B 35/12 114/315 |
| 3,074,195 | A | * | 1/1963 | Vanderpool ........... | A01M 31/06 43/26.1 |
| 3,183,878 | A | * | 5/1965 | Aschauer ............... | B63H 11/08 239/265.27 |
| 3,203,131 | A | * | 8/1965 | Myers .................... | A01K 91/02 43/26.1 |
| 3,229,420 | A | * | 1/1966 | Dias ....................... | A63H 23/04 446/154 |
| 3,418,751 | A | * | 12/1968 | Mabuchi ................ | A63H 23/04 446/162 |
| 3,466,798 | A | * | 9/1969 | Guglielmi .............. | A63H 23/10 446/162 |
| 3,477,173 | A | * | 11/1969 | Mabuchi ................ | A63H 23/04 446/165 |

(Continued)

OTHER PUBLICATIONS

"TrollingBobber.com—Self Propelled Fishing Tackle and Fishing Gifts", http://www.trollingbobber.com, downloaded Sep. 16, 2013, 3 pgs.

*Primary Examiner* — Darren W Ark
(74) *Attorney, Agent, or Firm* — Dorsey & Whitney LLP

(57) ABSTRACT

A mechanized trolling device includes a flotation chamber, a power source and motor in a water-tight enclosed chamber, and a sheltered impeller. The device travels many times the distance that an angler can cast, and automatically shuts off after a set period of time. A fishing line attached to the device can be deployed so the angler can fish at the depth of the water where the device has travelled.

20 Claims, 17 Drawing Sheets

(56) References Cited

U.S. PATENT DOCUMENTS

| | | | | |
|---|---|---|---|---|
| 3,548,771 A * | 12/1970 | Hastings | A63B 35/12 | |
| | | | 114/315 | |
| 3,550,386 A * | 12/1970 | Ballinger | B63C 11/48 | |
| | | | 114/337 | |
| 3,555,721 A * | 1/1971 | Furuoka | A63H 23/06 | |
| | | | 446/165 | |
| 3,630,165 A * | 12/1971 | Bottger | B63H 5/14 | |
| | | | 114/315 | |
| 3,710,500 A * | 1/1973 | Pena | 43/26.1 | |
| 3,739,516 A * | 6/1973 | Holling | A01K 91/02 | |
| | | | 43/26.1 | |
| 3,889,623 A * | 6/1975 | Arnold | B63H 11/08 | |
| | | | 440/39 | |
| 3,890,920 A * | 6/1975 | Buelk | A63B 35/12 | |
| | | | 114/315 | |
| 3,911,609 A * | 10/1975 | Baya | 43/26.1 | |
| 4,161,077 A * | 7/1979 | Ciaccio et al. | 43/26.1 | |
| 4,241,535 A * | 12/1980 | Tsukuda | A63H 23/10 | |
| | | | 446/162 | |
| 4,274,357 A * | 6/1981 | Dawson | B63B 35/7943 | |
| | | | 114/55.51 | |
| 4,339,888 A * | 7/1982 | Sheng-Jung | 43/26.1 | |
| 4,442,621 A * | 4/1984 | Kent | A01K 91/02 | |
| | | | 43/26.1 | |
| 4,458,621 A * | 7/1984 | De Clifford | B63B 35/00 | |
| | | | 114/255 | |
| 4,536,985 A * | 8/1985 | Caviness | 43/26.2 | |
| 4,635,391 A * | 1/1987 | Early | 43/26.1 | |
| 4,638,585 A * | 1/1987 | Korte | A01K 91/02 | |
| | | | 43/26.1 | |
| 4,757,633 A * | 7/1988 | Van Cleve | 43/26.1 | |
| 4,879,833 A * | 11/1989 | Threlkeld | 43/26.1 | |
| 5,016,385 A * | 5/1991 | Blease | A01K 97/01 | |
| | | | 43/26.1 | |
| 5,077,929 A | 1/1992 | Khan | | |
| 5,086,581 A * | 2/1992 | Barra et al. | 43/26.1 | |
| 5,154,016 A | 10/1992 | Fedora et al. | | |
| 5,220,231 A * | 6/1993 | Veronesi | B63H 1/16 | |
| | | | 310/90 | |
| 5,293,712 A * | 3/1994 | Lo | 43/26.1 | |
| 5,303,666 A * | 4/1994 | DeSantis | B63C 11/46 | |
| | | | 114/315 | |
| 5,363,587 A * | 11/1994 | Nordling | 43/26.1 | |
| 5,423,278 A * | 6/1995 | Lashman | B63C 11/46 | |
| | | | 114/315 | |
| 5,513,591 A * | 5/1996 | Quartarone | B63B 13/02 | |
| | | | 114/173 | |
| 5,619,950 A * | 4/1997 | Ikeda | B63B 35/731 | |
| | | | 114/363 | |
| 5,634,423 A * | 6/1997 | Lashman | A63B 35/12 | |
| | | | 114/315 | |
| 5,687,670 A * | 11/1997 | Rice, IV | B63G 8/16 | |
| | | | 114/151 | |
| 6,152,791 A * | 11/2000 | Sinko | B63B 1/107 | |
| | | | 114/61.12 | |
| 6,263,611 B1 * | 7/2001 | Kimura | 43/26.1 | |
| D456,060 S * | 4/2002 | Jacobson | D22/146 | |
| 6,389,732 B1 * | 5/2002 | Daniel | 43/26.1 | |
| 6,508,191 B1 * | 1/2003 | Spoljaric | B63J 3/04 | |
| | | | 114/244 | |
| 6,520,105 B2 * | 2/2003 | Koda et al. | 43/26.1 | |
| 6,665,789 B1 * | 12/2003 | Stecker, Sr. | B63C 11/46 | |
| | | | 114/315 | |
| 6,729,931 B2 * | 5/2004 | Lee | A63H 23/04 | |
| | | | 446/165 | |
| 6,760,995 B2 * | 7/2004 | Mueller | 43/26.2 | |
| 6,976,891 B1 * | 12/2005 | Mele | B63H 11/113 | |
| | | | 114/151 | |
| 7,055,280 B2 * | 6/2006 | Shen et al. | 43/26.1 | |
| 7,168,387 B1 * | 1/2007 | Al-Garni | B63C 11/02 | |
| | | | 114/312 | |
| 7,441,509 B2 * | 10/2008 | Piska | 43/26.1 | |
| 7,854,087 B1 * | 12/2010 | Pervez | 43/26.1 | |
| 7,971,385 B2 * | 7/2011 | Woodhouse et al. | 43/26.1 | |
| 8,154,953 B1 * | 4/2012 | Sims et al. | 43/26.1 | |
| 8,627,593 B1 * | 1/2014 | Schepp et al. | 43/26.1 | |
| 8,795,009 B1 * | 8/2014 | Yan | F02K 3/00 | |
| | | | 114/288 | |
| 9,131,672 B1 * | 9/2015 | Kagan | A01K 89/00 | |
| 2004/0203298 A1 * | 10/2004 | Chaix | B63H 11/08 | |
| | | | 440/38 | |
| 2005/0042970 A1 * | 2/2005 | Schwartz | A63H 23/005 | |
| | | | 446/154 | |
| 2005/0102883 A1 * | 5/2005 | Temes | 43/26.1 | |
| 2005/0112990 A1 * | 5/2005 | Higashida | A63H 23/08 | |
| | | | 446/161 | |
| 2005/0138857 A1 * | 6/2005 | Markley et al. | 43/26.2 | |
| 2005/0208867 A1 * | 9/2005 | Higashida | A63H 30/04 | |
| | | | 446/161 | |
| 2007/0175082 A1 * | 8/2007 | Barrett | 43/26.1 | |
| 2008/0072812 A1 * | 3/2008 | Vitale | B63C 11/46 | |
| | | | 114/315 | |
| 2009/0293336 A1 * | 12/2009 | Lankinen | 43/4 | |
| 2010/0212571 A1 * | 8/2010 | White | A63B 35/12 | |
| | | | 114/315 | |
| 2010/0301168 A1 * | 12/2010 | Raposo | A63H 23/00 | |
| | | | 244/171.2 | |
| 2011/0138675 A1 * | 6/2011 | Cutts | 43/26.1 | |
| 2011/0305518 A1 * | 12/2011 | Pearce | B63B 35/44 | |
| | | | 114/294 | |
| 2014/0090288 A1 * | 4/2014 | Freeman | 43/26.1 | |
| 2016/0176485 A1 * | 6/2016 | Sylvia | B63G 8/001 | |
| | | | 114/330 | |

* cited by examiner

MECHANIZED TROLLING DEVICE

TECHNICAL FIELD

The technology described herein relates to mechanized trolling devices.

BACKGROUND

An angler commonly can cast a fishing line a distance up to 40 feet. Environmental factors, such as wind, can decrease the cast distance. Use of heavier weight fishing line can help increase the cast distance to about 50 feet. However, many desirable fish are located further than 50 feet from the angler's position. In order for an angler to fish more than about 50 feet away from shore, a boat, inner tube, or other device is commonly used to position the angler closer to the desired fishing location. The use of a boat or other device is often undesirable or impractical. For example, for some bodies of water ingress points are limited. Similarly, many bodies of water have currents, tides or other environmental factors which limit the ability of an angler to position a hook or other device at a desired position other than in the immediate proximity of their current position. Accordingly, a need exists for a mechanized trolling device which enables an angler or other person to position bait, a hook, line and/or other objects in a body of water at a greater distance than that commonly possible by casting. Desirably, such a mechanized trolling device enables the placement of a hook or other object at at least one desired position in a reliable manner while minimizing any disturbances (e.g., noise, pressure or the like) to the aqueous environment at the desired location.

The information included in this Background section of the specification, including any references cited herein and any description or discussion thereof, is included for technical reference purposes only and is not to be regarded as subject matter by which the scope of the invention as defined in the claims is to be bound.

SUMMARY

Disclosed herein are mechanized trolling devices that may be used for a variety of activities such as fishing. The mechanized trolling devices include a flotation component, a propulsion component, and a steerage/stability component. The propulsion component may include a power source, a motive source, a thrust-inducing source, and a control source. The flotation component may be a flotation chamber, the power source may be a battery, the motive source may be an electric motor, the thrust-inducing source may be an impeller, the control source may be power control circuitry, and the steerage/stability component may be one or more rudders.

The propulsion component may be located in a second chamber. The battery and motor may be housed in an enclosed sub-chamber of the second chamber, which prevents them from being exposed to water or moisture, which increases their useful life. The impeller may be sheltered in the second chamber, which minimizes and/or prevents injury from rotating blades and/or entanglement of a fishing line on the impeller.

In one embodiment, the device automatically shuts off after operating for a period of time. The automatic shut off may be controlled by a timer circuit.

Methods of using the mechanized trolling device are also disclosed. In one embodiment, the mechanized trolling device is used in conjunction with a fishing line. The fishing line may be temporarily secured to the device by a line retainer on the device. The device may be cast into or onto water, after which the device may troll the fishing line to a position distant from the user. In one embodiment, the fishing line or other attached lines, such as a leader line, may be deployed from the device, which allows the user to fish at the depth of the water near the location of the device.

In one embodiment, a leader line is secured to the device while the device trolls out and/or in, which prevents snagging of the line on hazards in or near the aqueous environment. In one embodiment, the leader line is secured to the device by electromagnetic closure of a carabineer-like line retainer. In another embodiment, the leader line is secured to the device by weighted shot on the leader line sitting in a pocket on the device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments of the invention and illustrated in the accompanying drawings.

DETAILED DESCRIPTION

Figure 1:
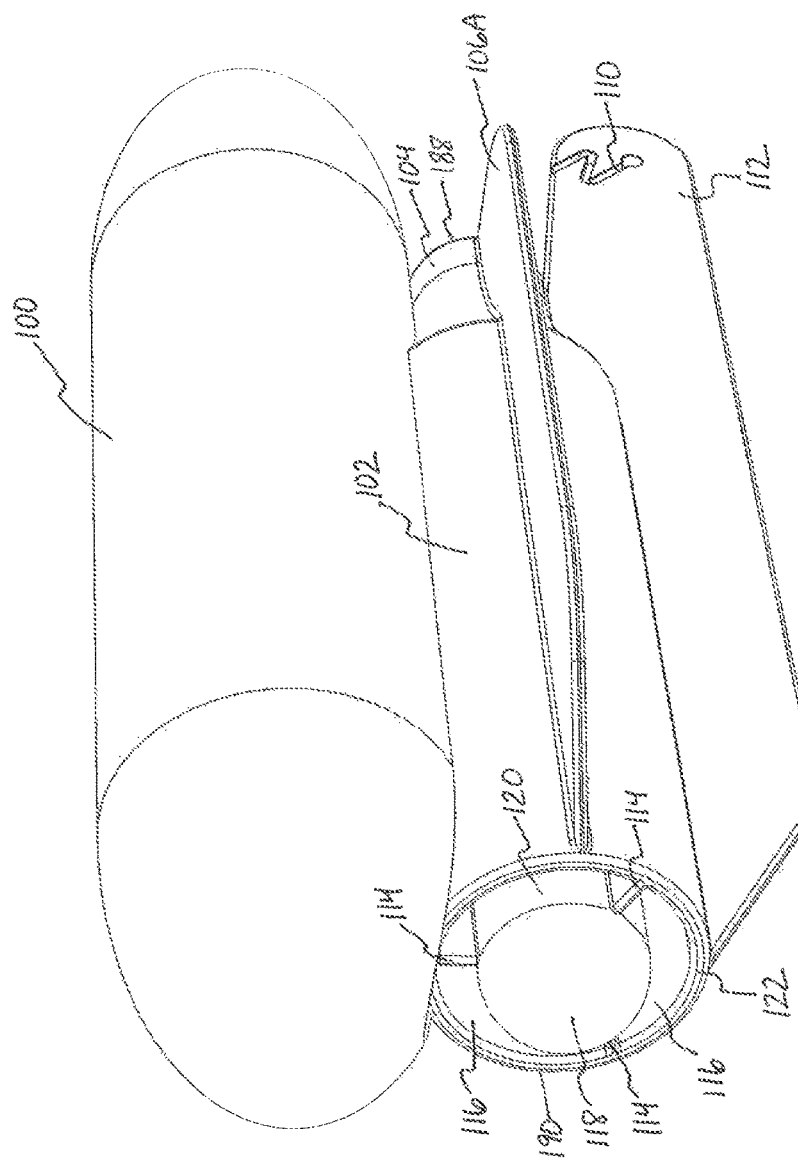
FIG. 1 is a right front isometric view of one embodiment of a mechanized trolling device.

A mechanized trolling device (as used herein, "Device") is disclosed herein. The Device may be generally understood as providing a device which enables an angler or other person desiring to position an object such as bait, a hook and fishing line at a desired position that is beyond their immediate proximity and those distances reachable by casting. The Device, as described herein in accordance with one or more exemplary embodiments, desirably provides a reliable and reusable combination of components that facilitate consistent operation of the Device and the associated activities, such as fishing, while avoiding interruption of operations from snagged lines, entanglement of lines, uncontrolled operation or otherwise.

In at least one embodiment, the Device includes a flotation component, a propulsion component and a steerage/stability component. These components, which may be combined in various permutations and combinations, collectively provide a Device configured to travel some distance from a point of insertion on the surface or at some desired depth under the surface of a body of water, such as a pond, lake, reservoir, sea, ocean or otherwise, to a distant position at which a desired activity (e.g., fishing) is to occur. In at least one embodiment, the Device is configured to operate on the surface of a body of water. In other embodiments, the Device may be configured to operate in a submerged orientation, slightly submerged orientation or otherwise. For example, when used in conjunction with ice fishing activities, the Device may be configured to have a buoyancy that enables the device to troll under a frozen, or even partially frozen, body of water while traveling to a desired position. In other embodiments, the Device may be configured to permit the desired activity (e.g., fishing) to occur during transit of the Device from the operator's location to the desired position(s). Examples of activities which may be supported by the Device include, but are not limited to, fishing, monitoring, sensing and/or any other activities which are to occur at some distance away from a point of insertion of the Device onto or into the aqueous environment. Each of these components is described in greater detail herein with reference to one or more embodiments.

Turning now to the figures, various embodiments of the Device will be discussed in more detail with primary reference to a fishing activity. FIGS. 1-5 illustrate one embodiment of a Device disclosed herein. The Device may be any suitable size, shape, and weight. By way of example but not limitation, the Device may be about four inches in length, may be generally torpedo shaped, and may weigh about four ounces. As discussed below, a Device may be configured to have three primary functional components: a flotation component, a propulsion component and a steerage/stability component. Each of these components, which may be provided separately or combined in various embodiments, is described in greater detail below. In at least one embodiment, the Device comprises a flotation chamber 100 attached to a second chamber 102, which in the embodiment shown in the Figures is configured to be below the flotation chamber 100. It is to be appreciated that the second chamber 102 may be configured with any orientation to the flotation chamber 100, provided that the propulsion components provided in conjunction with the second chamber 102 are able to generate thrust to propel the Device in or upon the water.

A. Flotation Component

At least one embodiment of a Device includes a flotation component. The flotation component may be configured in any size, shape or orientation and may be hollow, solid, or otherwise. The flotation component may be manufactured from any suitable material.

In at least one embodiment, including the embodiment of FIG. 1, the flotation component may be configured as a flotation chamber 100. The flotation chamber 100 may be constructed of any suitable material known in the art including, but not limited to, plastic. The plastic may be polyurethane. In this embodiment, the flotation chamber 100 is substantially hollow and air-filled to create a buoyant chamber. In at least one embodiment, the flotation component may be expanded and/or contracted so as to provide a desired buoyancy at a desired depth. For example, the Device may be configured to sink when positioned on the surface of a body of water but to float upon reaching a given depth, at which the density of the water exceeds the density of the Device. Such buoyancy may be fixed or adjustable, as desired, by increasing or decreasing the density to surface ratio of a flotation component, which may occur, for example, by pumping more or less air into an expandable chamber.

The flotation chamber 100 may be any suitable shape and in one or more embodiments is generally formed in a streamlined shape that desirably reduces drag, hereinafter an "aerodynamic shape." Various forms of aerodynamic shapes are well known in the art, including for example and not by means of limitation, the torpedo shape. The flotation chamber 100 may be generally aerodynamically shaped in both the forward-facing and reverse-facing directions, which helps to reduce drag on the Device when it is travelling in either a forward or reverse direction, respectively. In one embodiment, the flotation chamber 100 is substantially torpedo shaped.

In at least one embodiment, the outer surface of the flotation component (for example, flotation chamber 100) is substantially smooth. In other embodiments, the outer surface of the flotation component may be stippled, sharkskinned, or have other indentations and extrusions.

In at least one embodiment, the flotation component may be integral with and/or provided separate from the propulsion and/or steerage/stability components of a Device. When provided as separate from the propulsion and/or steerage/stability components, the flotation component can be attached to such components as desired, for example, using screws, tab connections, rivets or otherwise.

B. Propulsion Component

At least one embodiment of a Device includes a propulsion component configured to create a motive force that propels the Device through the water (on the surface, partially submerged, fully submerged or otherwise) from a point of insertion to at least one distant position. It is to be appreciated that the distance of travel of the Device from the point of insertion to one or more distant positions may be manually, semi-automatically, automatically, and/or remotely controlled by the operator of the Device, as desired for any given embodiment. As mentioned above, the propulsion component may be provided integral with the flotation component of a Device or may be provided separately, for example, in a second chamber 102 as shown in FIG. 1.

The second chamber 102 may be constructed of any suitable material known in the art including, but not limited to, plastic. The plastic may be polyurethane. The second chamber 102 may be substantially cylindrical in shape. The second chamber 102 may narrow or taper toward the exit orifice 188. The outer surface of the hull 122 of the second chamber 102 may be substantially smooth.

The propulsion component generally includes a power source, a motive source and a thrust-inducing source, such as a propeller or impeller. An optional control source may also be included. These sources may be configured in any desired configuration. In the embodiment shown in FIG. 1, the power and motive sources are generally configured inside the second chamber 102, which may be separated actually and/or functionally into one or more sub-chambers 120. More specifically, in the embodiment shown in FIG. 3A, the second chamber 102 is separated into two sub-chambers: a first sub-chamber 184 for housing a battery and a second sub-chamber 186 for housing an electric motor. In at least one embodiment, the one or more sub-chambers are enclosed and/or water-tight, which provides many benefits including preventing the battery and motor from being exposed to water or moisture, which increases their useful life.

1. Power Source

In at least one embodiment, the power source is a battery. The battery may be any suitable battery known in the art including, but not limited to, alkaline batteries such as AAA or AA batteries, nickel cadmium batteries, lithium batteries, rechargeable batteries, marine batteries or otherwise. Any number or combination of batteries may be utilized and any desired combination of voltage and current output by such battery may be used. In at least one embodiment, the battery is replaceable and/or rechargeable when its stored power has been depleted.

In another embodiment, the power source is a capacitor. The capacitor may be any suitable capacitor known in the art. The capacitor may be recharged by any means known in the art such as by induction, application of electrical current or otherwise. By way of example but not limitation, a charging station may be used to recharge the capacitor. The charging station may be plug-in or battery-powered.

Figure 3A:
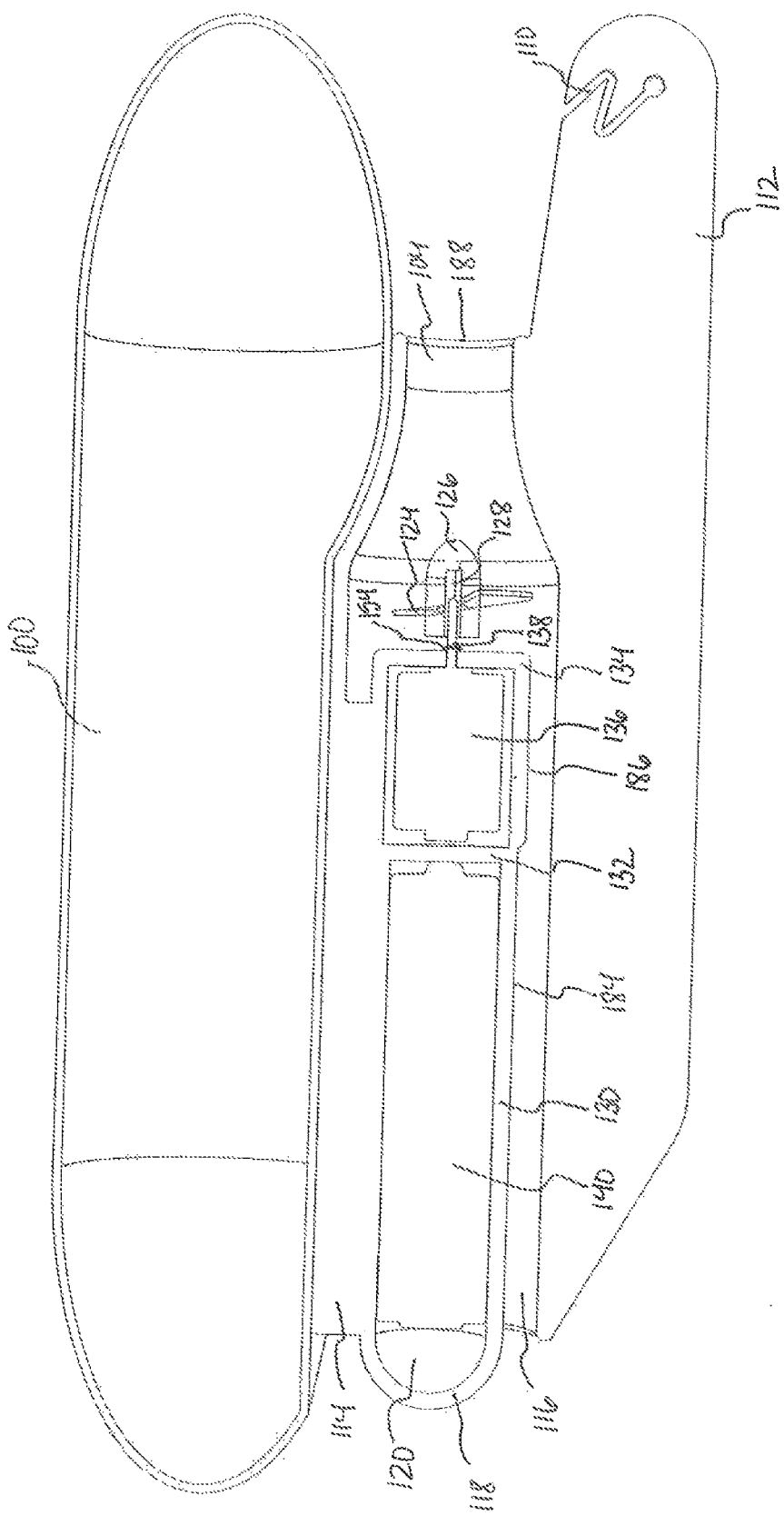
FIG. 3A is an elevation view in cross section taken along line 3A in FIG. 2B of the mechanized trolling device of FIG. 1.
Figure 3B:
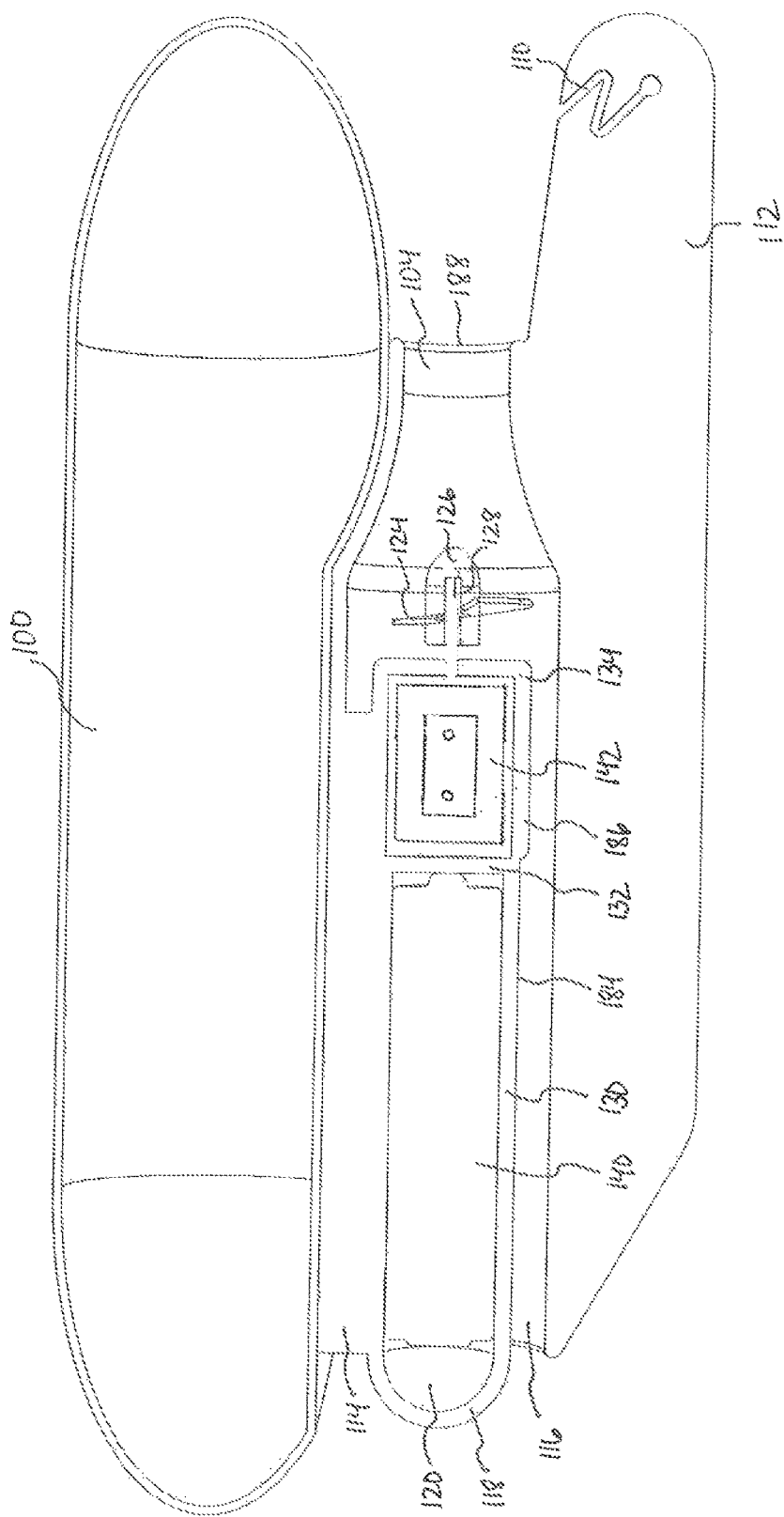
FIG. 3B is FIG. 3A with the motor removed to reveal a control circuit.

Referring to FIG. 3A, the power source 140 may be partially or fully surrounded by a side wall 130 of the sub-chamber 120. The power source 140 may be positioned adjacent to a dividing wall 132 of the sub-chamber 120.

Figure 7B:
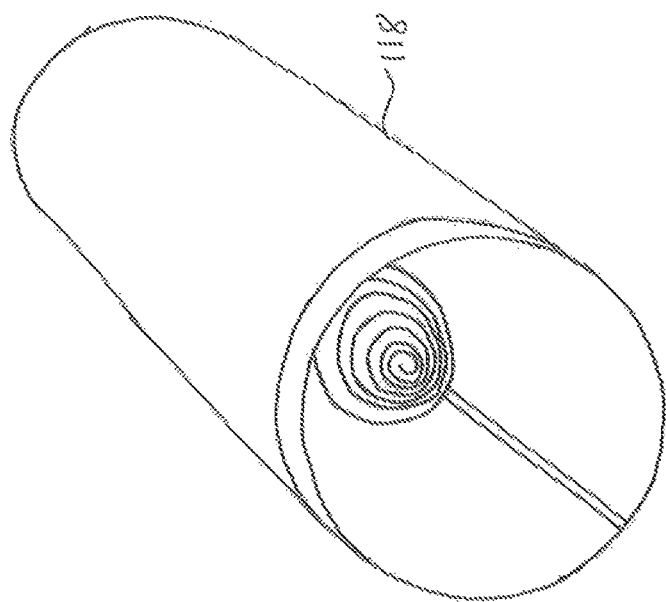
FIG. 7B is a top front isometric view of one embodiment of a cap of the mechanized trolling device of FIG. 1 or FIG. 6A.
Figure 7A:
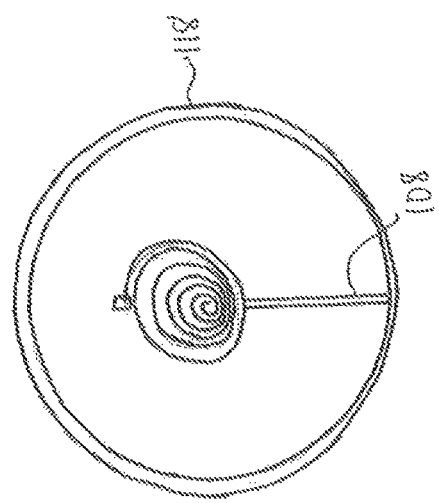
FIG. 7A is a top isometric view of one embodiment of a cap of the mechanized trolling device of FIG. 1 or FIG. 6A.

For those embodiments providing for a replaceable and/or removable power source, such as replaceable batteries, a removable cover providing access to the chamber or sub-chambers holding such power source may be provided. Referring again to FIG. 3A, a cap 118 may be positioned at the front end of an enclosed chamber 120. The cap 118 may be comprised of plastic, for example polyurethane, or any other desired material, and can be provided in any desired size, shape or configuration. For example, in one embodiment, the cap 118 is substantially hemispherically shaped while in another embodiment, the cap 118 is substantially bullet shaped. The power source 140 may be positioned outside of or partially or fully inside the cap 118. In one embodiment, the cap 118 houses one or more contacts 108 (see FIGS. 7A and 7B). The one or more contacts 108 may provide an electrical connection with the sub-chamber 120.

When positioned in a fastened configuration on a chamber, the cap 118 desirably forms a water-tight seal with the body of the chamber. In one embodiment, the cap 118 snaps on to the body of the sub-chamber 120. In another embodiment, the cap 118 and body of the sub-chamber 120 are complementarily threaded and the cap 118 screws on to the sub-chamber 120. The degree of sealing necessary for any desired configuration may vary based upon, with respect to the chamber holding the power and/or motive sources, the intended depth of submersion, time of submersion, composition of the fluid and other operational factors.

It is to be appreciated that the power source, as desired, may be recharged by any known techniques including but not limited to external batteries, solar cells, electrical outlets or otherwise. Further, the size and capacity of any power source may vary with intended operation of any given embodiment of a Device. For example, a Device intended for operation in strong tide and/or current conditions may provide more power than a Device intended for operation on a still body of water, such as a pond or lake.

2. Motive Source

Every embodiment of the Device includes a motive source which is configured to propel the Device from a point of insertion to one or more distant points. To provide the energy necessary for such motion, each motive source is connected to a power source 140. When the motive source is an electric motor, the motive source is electrically connected to the power source. When the motive source is other than an electric motor, for example, a gasoline engine or otherwise, the power source may be an appropriately sized and configured fuel reservoir that is connected via a fluid connection to the engine. In one embodiment, as shown in FIG. 3A, the motive source, such as a motor 136, is positioned near or adjacent to the side wall 130 of the sub-chamber 120, near or adjacent to the dividing wall 132 of the sub-chamber 120, and/or near or adjacent to the rear wall 134 of enclosed chamber 120. The rear wall 134 may form a retaining device 150 (see FIG. 6B).

The motor 136 may be any suitable motor 136 known in the art. In one embodiment, the motor 136 is a direct current (DC) motor. In another embodiment, the motor 136 is an alternating current (AC) motor.

The motor 136 may operate at about 8,000-24,000 rpm. In one embodiment, the motor 136 operates at about 8,000-10,000 rpm. In another embodiment, the motor 136 operates at about 10,000-12,000 rpm. In another embodiment, the motor 136 operates at about 12,000-14,000 rpm. In another embodiment, the motor 136 operates at about 14,000-16,000 rpm. In a further embodiment, the motor 136 operates at about 16,000-18,000 rpm. In yet another embodiment, the motor 136 operates at about 18,000-20,000 rpm. In still another embodiment, the motor 136 operates at about 20,000-22,000 rpm. In another embodiment, the motor 136 operates at about 22,000-24,000 rpm.

The motor 136 may generate about 2-6 pounds of force. In one embodiment, the motor 136 generates about 2-3 pounds of force. In another embodiment, the motor 136 generates about 3-4 pounds of force. In another embodiment, the motor 136 generates about 4-5 pounds of force. In yet another embodiment, the motor 136 generates about 5-6 pounds of force. In still another embodiment, the motor 136 generates about 2.5 pounds of force.

In one embodiment, the motor 136 is a brushless 9 VDC, 115 mA motor with a no-load speed of 24,000 rpm. In another embodiment, the motor 136 is a 3.00 VDC motor with a no-load speed of 16,400 rpm and a speed of 13,200 rpm, and 8.5 G-cm of torque and 44 G-cm of stall torque.

Other forms of motors and motive sources may be used in other embodiments as needed for desired implementation and use of the Device.

3. Thrust-Inducing Source

In at least one embodiment, the propulsion component may include a thrust-inducing source such as a propeller, an impeller or otherwise. The thrust-inducing source is operably connected to the motive source, for example, via a drive shaft a drive belt or otherwise. In at least one embodiment, the thrust-inducing source is located inside the second chamber 102 while being external to the one or more sub-chambers housing the power and motive sources. When configured for at least an impeller embodiment, the second chamber 102 includes an intake housing 190 and an exit orifice 188, which may be connected to a rear nozzle 104. The intake housing 190 is typically configured to have a larger diameter opening than the exit orifice 188 so as to create a Venturi effect upon the water being drawn into the second chamber 102 during the rotation of the impeller by the motor, when the motor is activated. That is, using well-known Venturi principles, the thrust-inducing source draws water through the length of the second chamber 102, past the impeller and out the exit orifice 188 at a greater pressure than exists for the water prior to entering the intake housing 190, which creates thrust which propels the Device in a desired direction. The configuration of the second chamber 102 may vary. In at least one embodiment the second chamber 102 may be configured to shelter the thrust-inducing source from the external environment and thereby minimize and/or prevent injury from rotating members to operators and/or entanglement of a fishing line on the thrust-inducing source.

In at least one embodiment, the thrust-inducing source may be configured as a propeller having one or more blades of a desired pitch designed to "screw" through the water. In embodiments employing propellers versus impellers, the propulsion component, such as the second chamber 102, need not be configured to generate a Venturi effect. Instead, the thrust is produced in accordance with Bernoulli's principles and Newton's third law. The pitch of any propeller/impeller utilized in any embodiment of a device may be varied with operating conditions and performance considerations.

Figure 4:
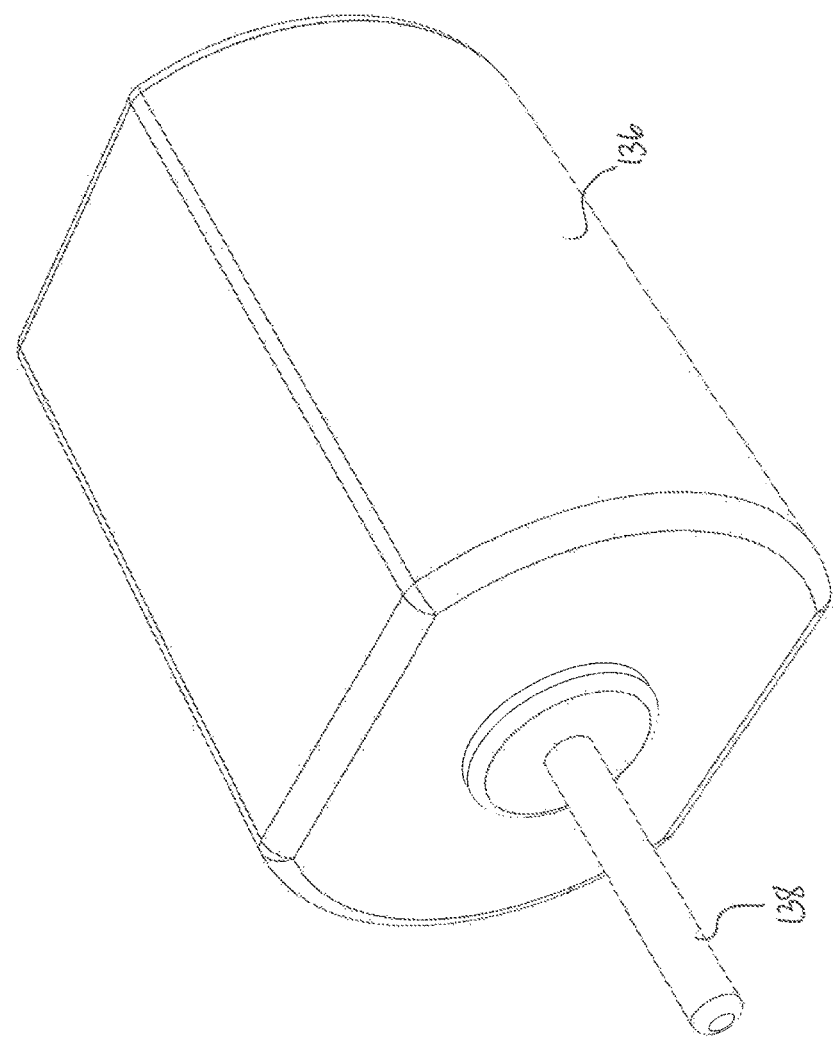
FIG. 4 is a top front isometric view of a motor of the mechanized trolling device of FIG. 1.
Figure 5:
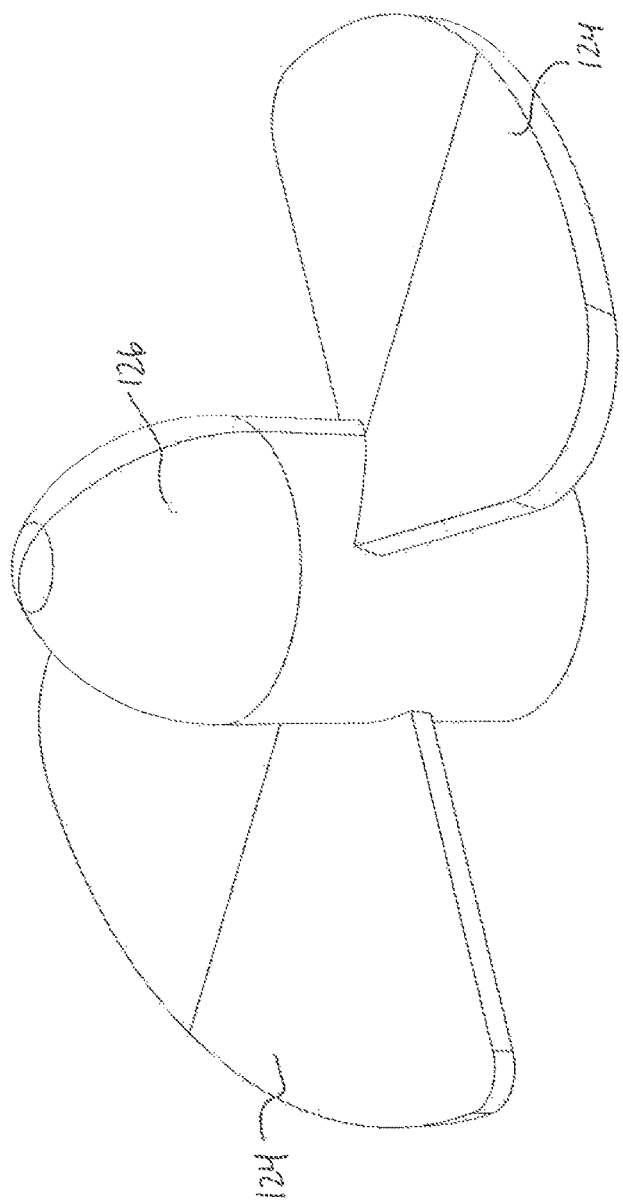
FIG. 5 is a top front isometric view of an impeller of the mechanized trolling device of FIG. 1.

As described above for at least one embodiment the motive source may be a motor. With reference to FIG. 4, the motor 136 may include a slot (not shown) for receiving a drive shaft 138 for mechanically connecting the motor 136 to the thrust-inducing source. The drive shaft 138 may be constructed of any suitable material known in the art including, but not limited to, metal. In one embodiment, the drive shaft 138 has a triangular edge that fits into a complementary-shaped slot in the motor 136, which secures the drive shaft 138 to the motor 136 in a water-tight configuration. In another embodiment, the drive shaft 138 has a square edge that fits into a complementary-shaped slot in the motor 136, which secures the drive shaft 138 to the motor 136 in a water-tight configuration. In another embodiment, the drive shaft 138 is cylindrically shaped and fits into a complementary-shaped slot in the motor 136.

In one embodiment, as depicted in FIG. 3A, the drive shaft 138 passes through a rear wall 134 between the motor 136 and thrust-inducing source, such as an impeller 126. The drive shaft 138 may be encircled by one or more O rings 154 positioned between the motor 136 and impeller 126. An O ring 154 may be positioned flush against the rear wall 134. Each O ring 154 functions to exclude water and moisture from the motor 136.

Figure 6A:
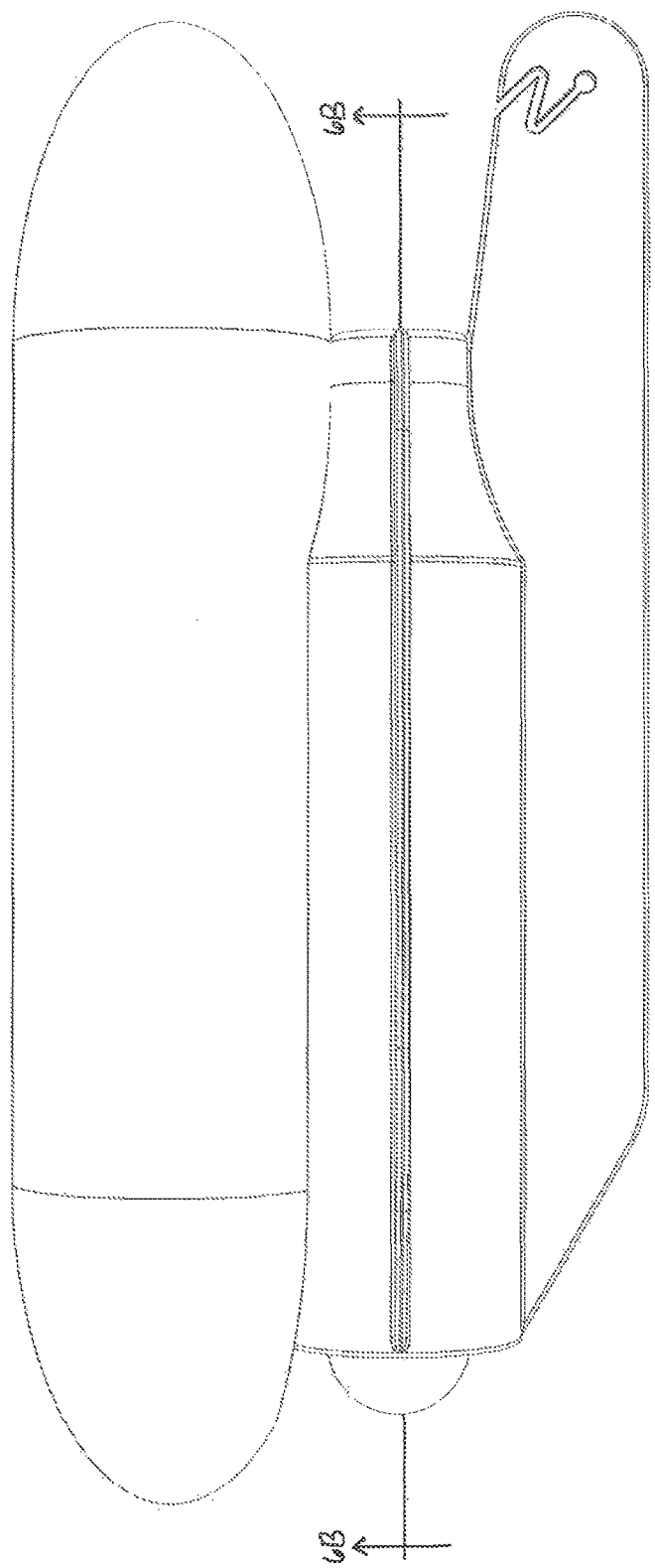
FIG. 6A is a right isometric view of another embodiment of a mechanized trolling device.
Figure 6B:
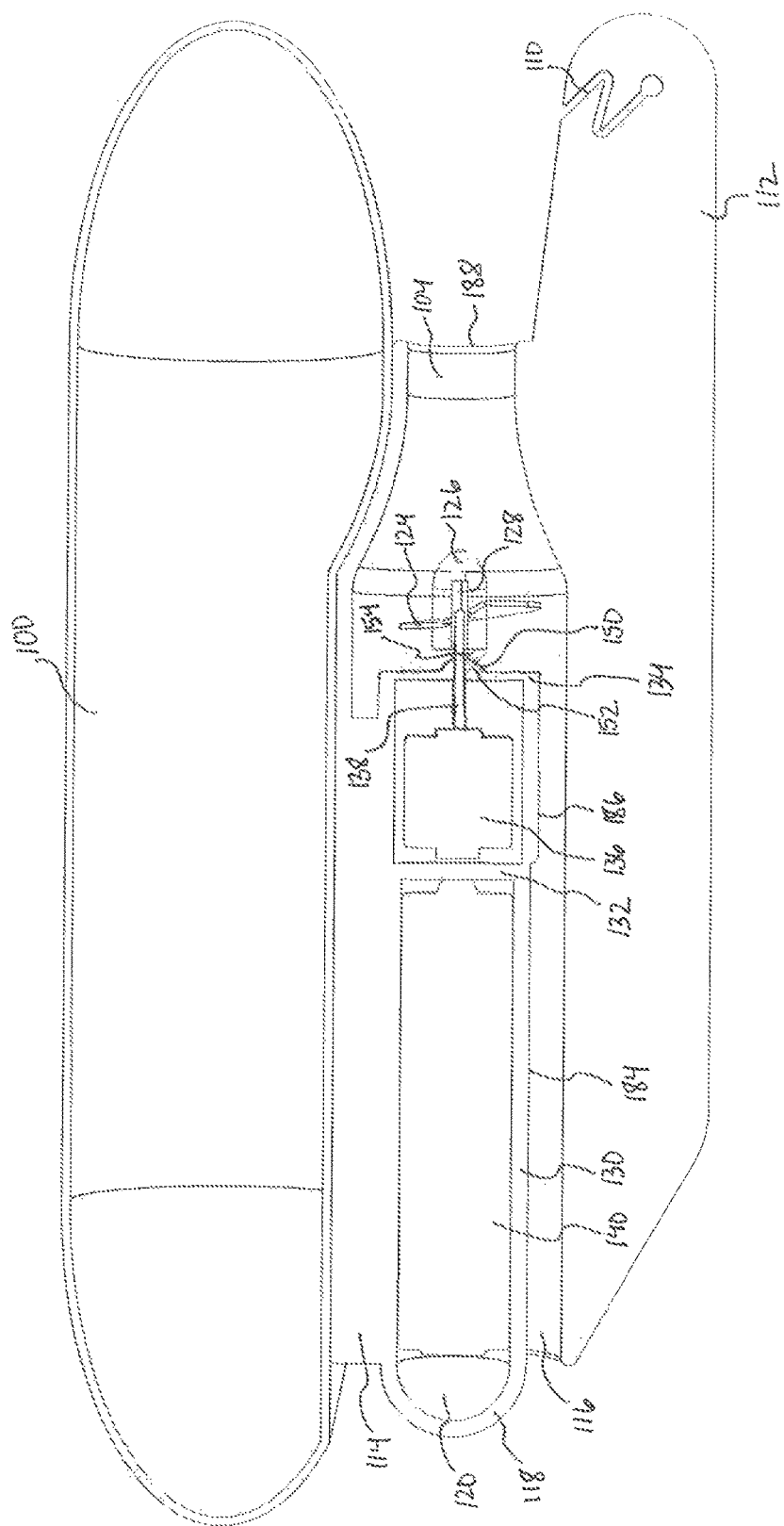
FIG. 6B is an elevation view in cross section taken along line 6B in FIG. 6A of the mechanized trolling device of FIG. 6A.

In one embodiment, as depicted in FIG. 6B, the drive shaft 138 passes through a water-excluding material 152 between the motor 136 and impeller 126. The water-excluding material 152 may be any one or more materials known in the art that exclude water. In one embodiment, the one or more material is a lubricant. In another embodiment, the one or more material is petroleum jelly. The water-excluding material 152 may be confined by a retaining device 150, such as a cone-shaped retaining device. The retaining device 150 may be constructed of any suitable material know in the art, including, but not limited to, plastic. The plastic may be polyurethane. The water-excluding material 152 functions to exclude water and moisture from the motor 136. The drive shaft 138 may be encircled by one or more O rings 154 positioned between the motor 136 and impeller 126. An O ring 154 may be positioned flush against the retaining device 150. Each O ring 154 functions to exclude water and moisture from the motor 136.

The drive shaft 138 fits into a drive shaft receptacle 128 in an impeller 126, which configuration creates an operable connection between the motor 136 and impeller 126. The impeller 126 (see also FIG. 5) may be constructed of any suitable material known in the art, including, but not limited to, plastic. In one embodiment, the impeller 126 has two blades 124. In another embodiment, the impeller 126 has three blades 124. In still another embodiment, the impeller 126 has four or more blades 124.

The impeller 126 may be configured as a propeller and not sheltered from the environment. As described above, when the principle of thrust generation relies on Venturi principles, an impeller may be used. When the principles of thrust generation rely on Bernoulli principles, a propeller or screw may be realized, without the need to shelter the thrust-inducing source from the external environment. Regardless of the principle of operation relied upon for thrust generation, the impeller 126 (for example) may be positioned in the second chamber 102 forward from the rear nozzle 104. This arrangement protects a user from touching the propeller blades 124 and being injured by touching the blades 124. This arrangement also helps prevent fishing line from becoming snagged on the propeller blades 124.

In one embodiment, the impeller 126 and drive shaft 138 are constructed as one piece, which in at least one embodiment facilitates the assembly and disassembly of the Device.

In at least one embodiment, the impeller 126 and drive shaft 138 are separate pieces. When the impeller 126 and drive shaft 138 are separate pieces, they may be secured to each other by any means known in the art. In one embodiment, the impeller 126 and drive shaft 138 are glued together. In another embodiment, the impeller 126 and drive shaft 138 are bonded together. In another embodiment, the impeller 126 and drive shaft 138 are compressed together. In yet another embodiment, the impeller 126 and drive shaft 138 are complementarily threaded, and the drive shaft 138 screws into the impeller 126 in a direction opposite the direction that the motor 136 turns the drive shaft 138. In still another embodiment, the impeller 126 is encircled by a ring (not shown), which ring fits up against a lip (not shown) in the interior of the sub-chamber 120. Any mechanism that helps secure the impeller 126 to the drive shaft 138 may simultaneously help secure the drive shaft 138 to the motor 136.

In one embodiment, a screen (not shown) is positioned across the intake housing 190. The screen helps prevent material from entering the second chamber 102, which helps exclude debris and thereby prevent damage to the thrust-inducing source. In another embodiment, a screen (not shown) is positioned across the exit orifice 188. The screen helps prevent material from entering the second chamber 102, which helps exclude debris and thereby prevent damage to the thrust-inducing source.

4. Control Source

In at least one embodiment, a Device may be configured with a control source, which is configured to control the operation of the device as desired. The control source may include power conditioning circuitry. That is, depending upon the operational characteristics desired for any given Device, for example, a variable speed versus a fixed speed mode of operation, any well known in the art and corresponding power control circuitry may be employed. Such circuitry may, for example, reduce the voltage and/or current of the electrical power provided to the motive source (when the motive source is an electric motor). Similarly, the power control circuitry may provide for a pulsed or intermittent providing of power to the motive source, for example, to periodically minimize the impact of drift, current, or other factors on the positioning of a Device at a desired position or positions.

In at least one embodiment, the control source may include an operator interface. The operator interface may include a button 178 (see FIG. 8B), for example, a push button. The button 178 may be positioned on the cap 118. The button 178 may be substantially round in shape or in any other configuration, size, placement and/or orientation. The button 178 may be soft or hard. The button 178 may be a control or power button, which upon activation closes any electrical circuit existing between the one or more power sources and the motive source. The button 178 may provide for variable operating states, for example, by pressing the button twice a second mode of operation is enabled, whereas by holding the button for a given period of time, another mode of operation may be enabled or disabled. The control source may include those control electronics that are well known in the art to interface with programmable logic arrays and/or other control circuitry to provide any desired level of operation or control of the Device.

In at least one embodiment, a simple control source may include a timer circuit such that the motive source will operate for a specified time before stopping. Timed motor operation is beneficial because it conserves battery power. Also, when the impeller/propeller stops spinning, the impeller/propeller is no longer creating an environment that is disruptive to fish.

With reference to FIGS. 7A, 7B, 8A and 9, in one embodiment, the Device may be turned on by rotating the cap 118. Rotating the cap 118 may cause one or more contacts 108 inside the cap 118 to connect with one or more contacts (not shown) inside the sub-chamber 120. A signal may be transmitted to a control circuit 142, such as through one or more communication wires. The control circuit 142 may include one or more electrical components, such as a control chip. In some embodiments, the control circuit 142 may be a printed circuit board or other substrate that may provide support for one or more electrical components and communication between those components. The control chip may provide power to the motor 136 from the power source 140. For example, the control chip may transmit power from the power source 140 through one or more power wires 182 to the motor 136. As the motor 136 receives power, it begins to rotate the drive shaft 138, which rotates the impeller 126. The control chip may also provide power to the electromagnet 168 from the power source 140.

Figure 8A:
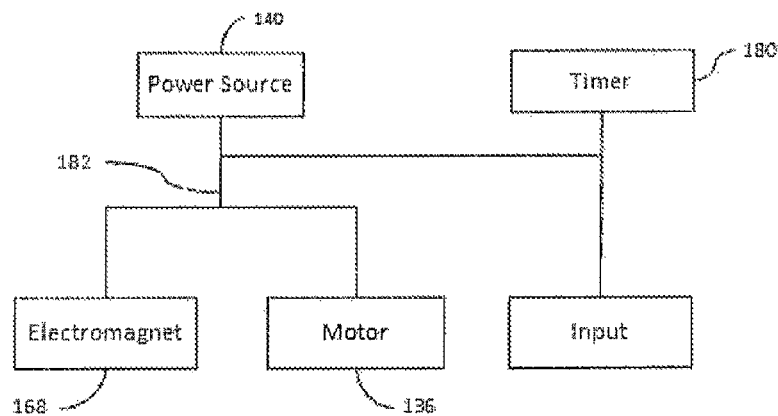
FIG. 8A is a simplified block diagram of one embodiment of the electrical components of the mechanized trolling device of FIG. 1 or FIG. 6A.
Figure 8B:
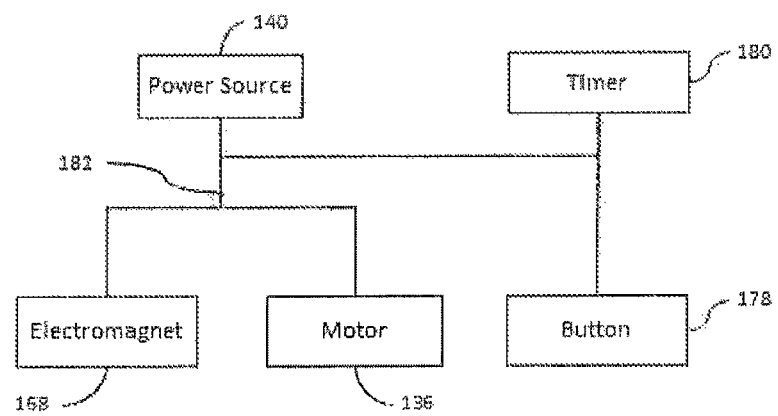
FIG. 8B is a simplified block diagram of another embodiment of the electrical components of the mechanized trolling device.
Figure 9:
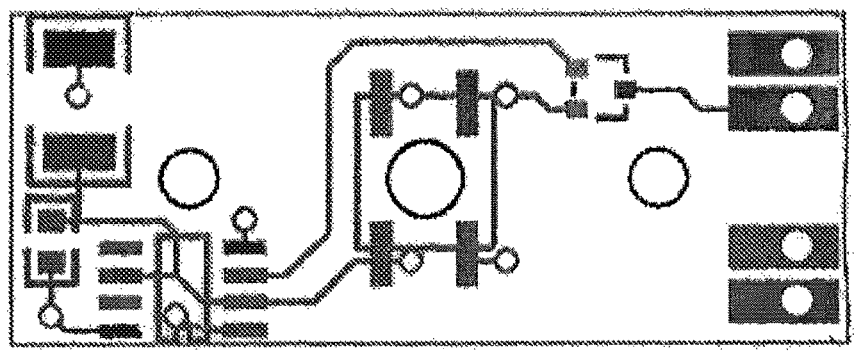
FIG. 9 is an illustrative control chip schematic for one example of the electrical components of the mechanized trolling device.

With reference to FIGS. 8B and 9 in another embodiment, the Device may be turned on by pressing a button 178. The button 178 may be pressed towards a button circuit, which may cause contacts on the button 178 to connect with contacts on the button circuit. Then the button circuit may transmit a signal through one or more communication wires to a control circuit 142. The control circuit 142 may include one or more electrical components, such as a control chip. In some embodiments, the control circuit 142 may be a printed circuit board or other substrate that may provide support for one or more electrical components and communication between those components. The control chip may provide power to the motor 136 from the power source 140. For example, the control chip may transmit power from the power source 140 through one or more power wires 182 to the motor 136. As the motor 136 receives power, it begins to rotate the drive shaft 138, which rotates the impeller 126. The control chip may also provide power to the electromagnet 168 from the power source 140.

In another embodiment, the control chip is further configured to automatically shut off power after a certain period of operation. In one embodiment, the power automatically shuts off after 180 seconds or fewer. In another embodiment, the power automatically shuts off after 90 seconds or fewer. In another embodiment, the power automatically shuts off after 75 seconds or fewer. In yet another embodiment, the power automatically shuts off after 60 seconds or fewer. In still another embodiment, the power automatically shuts off after 55 seconds or fewer. In a further embodiment, the power automatically shuts off after 50 seconds or fewer. In another embodiment, the power automatically shuts off after 45 seconds or fewer.

In one embodiment, the power automatically shuts off after 40 seconds or more. In another embodiment, the power automatically shuts off after 45 seconds or more. In another embodiment, the power automatically shuts off after 50 seconds or more. In yet another embodiment, the power automatically shuts off after 55 seconds or more. In still another embodiment, the power automatically shuts off after 60 seconds or more. In a further embodiment, the power automatically shuts off after 75 seconds or more. In another embodiment, the power automatically shuts off after 90 seconds or more. In another embodiment, the power automatically shuts off after 120 seconds or more. In another embodiment, the power automatically shuts off after 50-55 seconds.

In one embodiment, the automatic shut-off function is implemented by a timer 180, which may be programmed within or external to the control chip. In one embodiment, the timer 180 is initiated upon the user initially rotating the cap 118. In another embodiment, the timer 180 may be initiated upon the user initially pressing the button 178. In one embodiment, the timer 180 stops when the set period of time has expired. In another embodiment, the timer 180 may be stopped upon the user rotating the cap 118 again or pressing the button 178 again. If the timer 180 is allowed to run for the set period, at the end of the set period the control chip turns off power to the motor 136.

The Device disclosed herein may be controlled by a remotely controlled system. The system may include a radio signal generator for generating radio signals. The radio signal generator may be positioned with the user. The system may also include an antenna and/or a radio receiver for receiving signals from the radio signal generator. The antenna and/or radio receive may be positioned on the Device.

The signal generator may include one or more switches. The one or more switches may control power to the device, speed of the device, and/or direction of the device. The radio receiver may be in electrical communication with the motor. When a switch is adjusted, the signal generator may transmit a signal to the radio receiver, such as via the antenna, which adjusts the power, speed, and/or direction of the Device.

C. Steering/Stability Component

In at least one embodiment, the Device includes a steering/stability component. The steering/stability component may be configured to actively and/or passively control the direction of travel and/or the orientation of the Device while under propulsion and/or stationary. In at least one embodiment, the steering/stability component may be provided in conjunction with the second chamber 102 utilized with a propulsion component to include one or more vanes 114. The vanes 114 may be configured to channel any water propelled into the second chamber 102 and thereby enhance the Venturi effect and efficiency of the propulsion component, while passively controlling the orientation of the Device and decreasing drag as would occur from any turbulent flow of fluid through the second chamber 102. The vanes 114 can also be configured to function as connectors between the second chamber 102 and any sub-chambers enclosed therein, such as those for the power and/or motive sources.

Any number of vanes 114 may be present. In one embodiment, one vane 114 is present. In another embodiment, two, three, four, or more vanes 114 are present. When two or more vanes 114 are present, they may be substantially evenly distributed around the inner circumference of the second chamber 102, or they may be positioned close together.

Each vane 114 may be constructed of any suitable material known in the art including, but not limited to, plastic. The plastic may be polyurethane. Each vane 114 may be substantially the same size and shape. Each vane 114 may be substantially flat, may have smooth surfaces, and may have smooth and/or rounded edges. Each vane 114 may be substantially rectangular shaped. Each vane 114 may extend the entire length of the sub-chamber 120 or may be shorter than the length of the sub-chamber 120.

In one embodiment, one or more fins (not shown) are positioned to the rear of the impeller 126. The one or more fins may be secured to or adjacent to the flotation chamber 100 and the bottom rudder 112.

In at least one embodiment, one or more rudders may be attached to the hull 122 and/or the second chamber 102. For example, a right rudder 106A and a left rudder 106B may be attached to the right and left sides, respectively, of the second chamber 102. By way of example but not limitation, the right rudder 106A and left rudder 106B may help the Device travel in a substantially straight line while in use.

The right rudder 106A and left rudder 106B may be constructed of any suitable material known in the art including, but not limited to, plastic. The plastic may be polyurethane. The right rudder 106A and left rudder 106B may be any shape and size known in the art that helps provide direction, steering, and/or balance to the Device. The right rudder 106A may be substantially the same size and shape as left rudder 106B, or it may be a different size and shape. The right rudder 106A and left rudder 106B may each extend substantially horizontally away from the second chamber 102. The right rudder 106A and left rudder 106B may each be substantially flat, may have smooth surfaces, and may have smooth and/or rounded edges. The right rudder 106A and left rudder 106B may be substantially rectangular shaped. The right rudder 106A and left rudder 106B may each taper toward the front of the second chamber 102. The right rudder 106A and left rudder 106B may each extend the entire length of the second chamber 102 or may be shorter than or longer than the length of the second chamber 102. The right rudder 106A and left rudder 106B may each be in a fixed position relative to the second chamber 102, or each may pivot up towards the flotation chamber 100 and/or down away from the flotation chamber 100.

A bottom rudder 112 may be attached to the bottom of the second chamber 102. By way of example but not limitation, the bottom rudder 112 may help the Device travel in a substantially straight line while in use.

The bottom rudder 112 may be constructed of any suitable material known in the art including, but not limited to, plastic. The plastic may be polyurethane. The bottom rudder 112 may be any shape and size known in the art that helps provide direction, steering, and/or balance to the Device. The bottom rudder 112 may extend substantially vertically down and away from the second chamber 102. The bottom rudder 112 may be substantially flat, may have smooth surfaces, and may have smooth and/or rounded edges. The bottom rudder 112 may be substantially fin shaped. The bottom rudder 112 may taper toward the front of the second chamber 102. The bottom rudder 112 may extend the entire length of the second chamber 102 or may be shorter than or longer than the length of the second chamber 102. The bottom rudder 112 may extend the entire length of the flotation chamber 100 or may be shorter than or longer than the length of the flotation chamber 100. The bottom rudder 112 may be in a fixed position relative to the second chamber 102, or may pivot left and/or right.

In another embodiment, a nozzle, such as a rear nozzle 104, provided in conjunction with the propulsion components may be steerable and accordingly utilized to steer the direction of travel of the Device.

D. Other Components

In one embodiment, the Device is equipped with one or more lights. The lights may be LED lights or any other form or visible or non-visible light-generating devices. The light may be generated at one or more wavelengths, including those not visible to the human eye. The lights may be powered by the power source and controlled by a control circuit. The one or more lights are beneficial because fish are attracted to lights.

A line retainer 110 may be positioned in or adjacent to the bottom rudder 112. The line retainer 110 may be positioned toward the rear of the bottom rudder 112. The line retainer 110 may be any suitable configuration known in the art that temporarily secures a fishing line. In one embodiment, the line retainer 110 is a straight notch. In another embodiment, the line retainer 110 is a substantially zigzag-shaped notch. In another embodiment, the line retainer 110 is a slit comprising two angular facing edges, which edges overlap such that a fishing line is retained behind the edges. In yet another embodiment, the line retainer 110 is a substantially circular cut-out in the bottom rudder 112. A pin or shaft may be present with the cut-out in a carabineer-like configuration. The shaft may be comprised of one or more magnetic materials.

In one embodiment, a pocket 148 (see FIG. 10) is positioned in the bottom rudder 112. The pocket 148 may be positioned at the terminus of the line retainer 110. In another embodiment, the pocket 148 is positioned near the line retainer 110. The pocket 148 functions to temporarily hold a weighted shot 176. The weighted shot 176 may be any fishing line weight known in the art. In one embodiment, the weighted shot 176 is split shot. In one embodiment the split shot is comprised of at least one magnetic material. In another embodiment, the weighted shot 176 is fishing putty.

In another embodiment, an electromagnet 168 (see FIG. 10) is positioned in or on the bottom rudder 112. The electromagnet 168 is powered by the power source 140 and is electrically coupled to the power source 140. The electromagnet 168 functions to temporarily secure a line, such as a leader line 170, to the bottom rudder 112.

In one embodiment, weighted shot 176 is secured to the leader line 170. In one embodiment, the weighted shot 176 is split shot comprised of at least one magnetic material. The weighted shot 176 may be secured to the bottom rudder 112 by magnetic attraction between the weighted shot 176 and the electromagnet 168.

In another embodiment, the electromagnet 168 is a shaft in or adjacent to the line retainer 110. When the shaft receives power, it secures the leader line 170 to the bottom rudder 112. In one embodiment, power to the shaft causes it to close, which secures the leader line 170. In another embodiment, power to the shaft causes it to move closer to a wall of the line retainer 110, which presses the leader line 170 between the shaft and the bottom rudder 112.

Principles of Operation

When fishing line is attached to the Device and the Device is turned on, upon insertion onto and/or into the water and release by the operator, the Device trolls the fishing line and any attached leader lines, bait, and hooks through water to the desired location. This distance of the desired location from the point of insertion may be many times further than a user is capable of casting the fishing line. Rudders may be attached to Device to help guide or steer the Device.

For at least one embodiment, the Device will continue to be propelled until the motor stops, for example upon the expiration of a preset running time. At this occurrence any attached leader lines, bait, and hooks may be deployed to the depth of the water at the location of the Device. The deployment of the leader lines and other components may occur due to gravity, user operation, release of a catch, the use of a line deployment motor or otherwise. It is to be appreciated that the deployment of the leader line or other component attached to the Device may occur automatically, semi-automatically or manually (e.g., by a tug or release of tension on a fishing line), as desired for any given use of the Device and any given activity associated therewith. The user may then wait for a fish to get caught on the line. The Device may be returned to the user by the user reeling in the attached fishing line, which action first pulls any attached leader lines, bait, and hooks up to the Device.

During use of the Device in water, the flotation component may sit substantially above the plane of the water. The flotation component may be brightly colored, which has the advantage of being highly visible in the water even at a distance from the user. The bright color may be one or more fluorescent color, such as fluorescent orange, fluorescent green, or fluorescent yellow.

During use of the Device in water, the second chamber 102 sits substantially below the plane of the water.

Water may enter the second chamber 102 through at least one water intake port 116. A water intake port may be positioned adjacent to a vane 114. Any number of water intake ports 116 may be present. In one embodiment, one water intake port 116 is present. In another embodiment, two, three, four, or more water intake ports 116 are present. The number of water intake ports 116 may equal the number of vanes 114.

In one embodiment (not shown), the flotation chamber 100 and second chamber 102 are constructed of one piece each. In another embodiment (not shown), the flotation chamber 100 is constructed of more than one piece, such as three pieces. The three pieces may be a front piece, center piece, and rear piece.

Figure 2A:
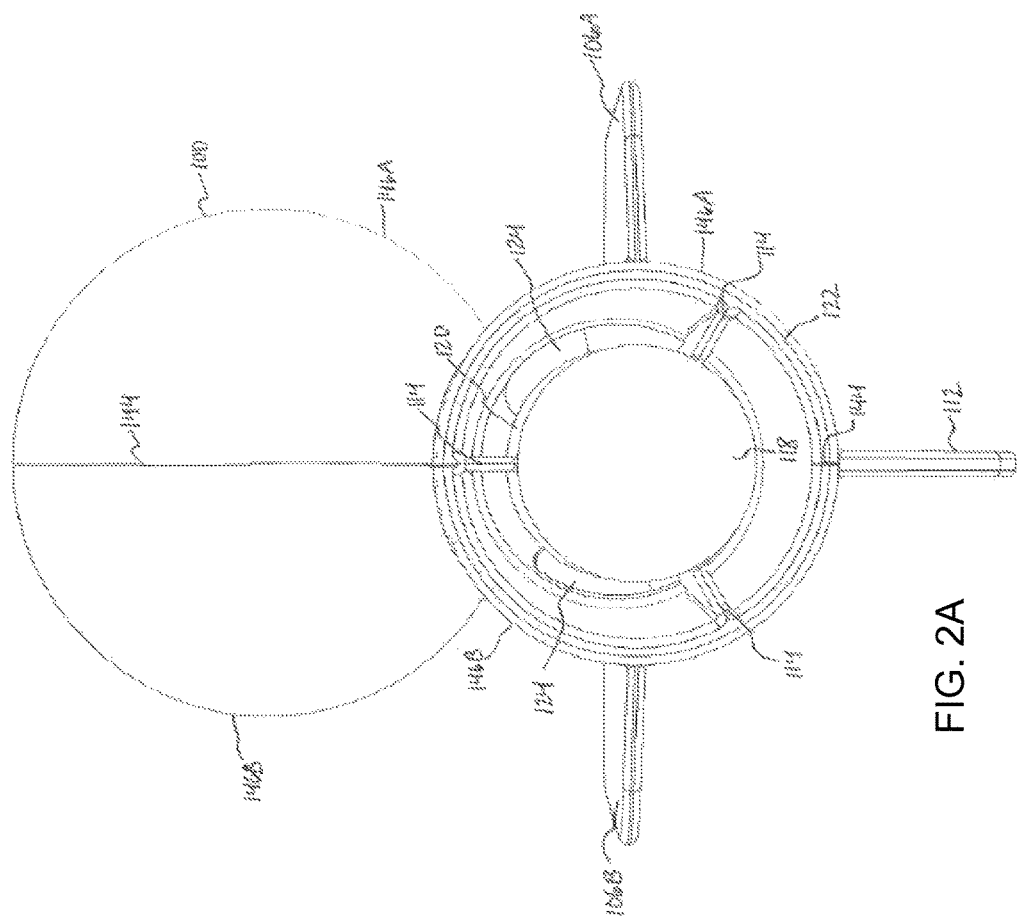
FIG. 2A is a front isometric view of the mechanized trolling device of FIG. 1.
Figure 2B:
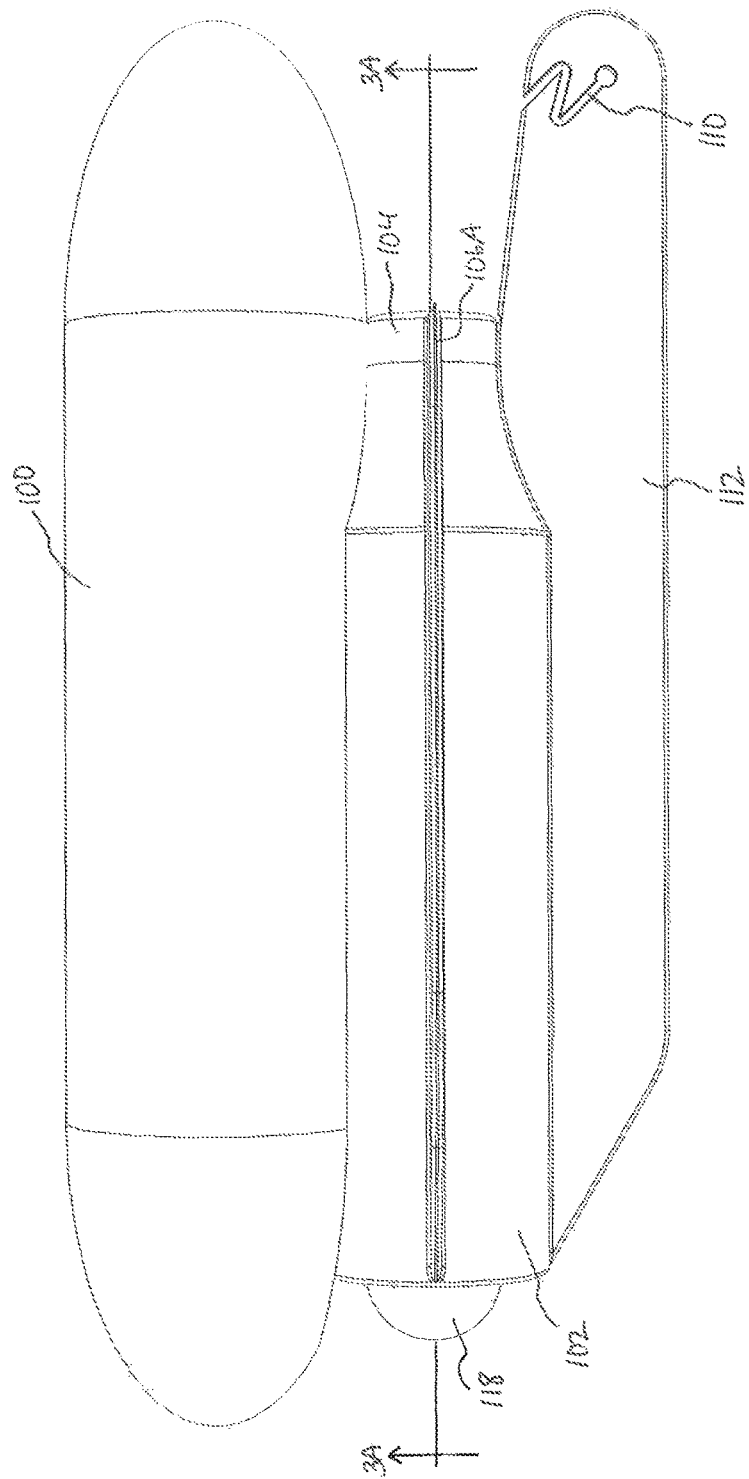
FIG. 2B is a right isometric view of the mechanized trolling device of FIG. 1.
Figure 2C:
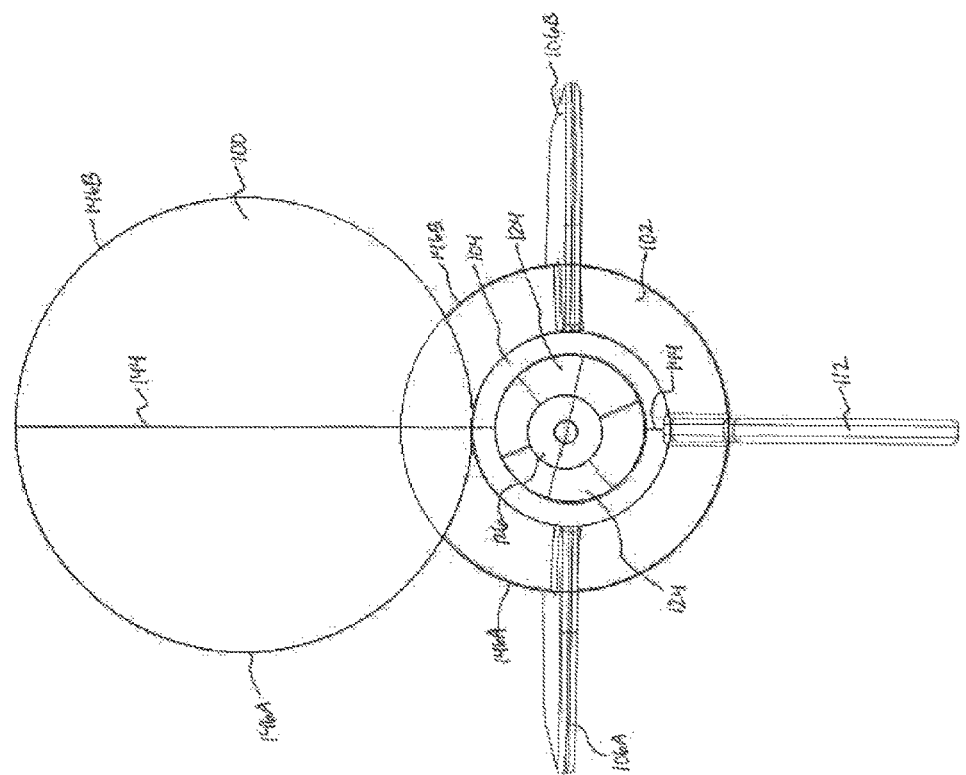
FIG. 2C is rear isometric view of the mechanized trolling device of FIG. 1.
Figure 2D:
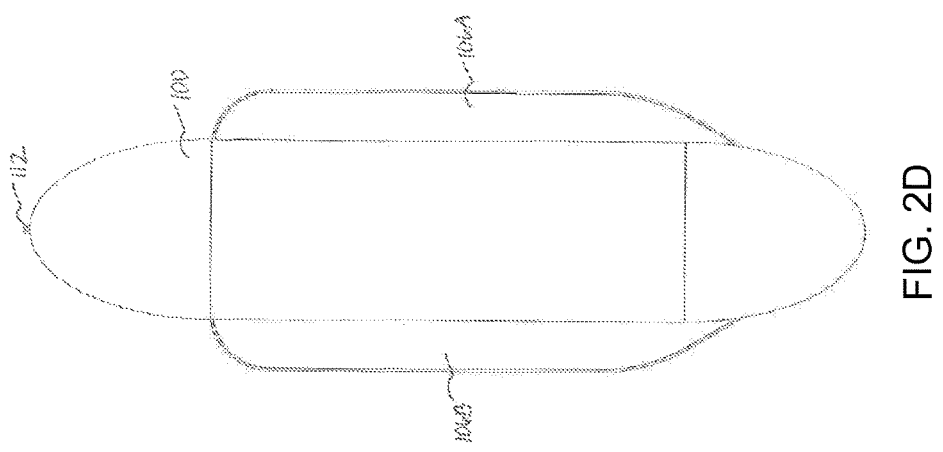
FIG. 2D is top plan view of the mechanized trolling device of FIG. 1.
Figure 2E:
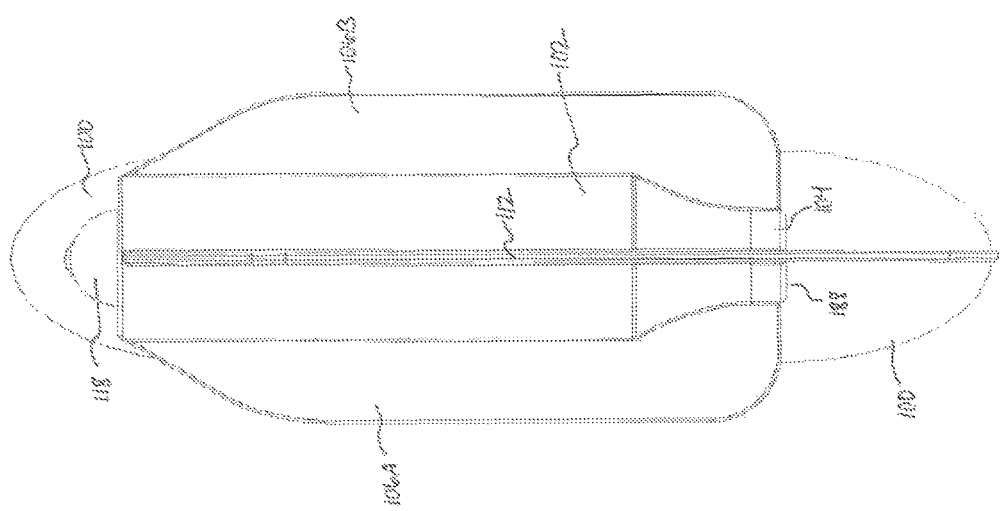
FIG. 2E is bottom plan view of the mechanized trolling device of FIG. 1.

In another embodiment, the flotation chamber 100 and second chamber 102, including the right rudder 106A and left rudder 106B, may be constructed in two pieces, such as a right piece 146A and a left piece 146B, joined at a seam 144 (see, e.g., FIGS. 2A and 2C). Each of the right piece 146A and left piece 146B may be comprised of plastic. The plastic may be molded plastic. The plastic may be polyurethane. The right side of the bottom rudder 112 may form part of the right piece 146A and the left side of the bottom rudder 112 may form part of the left piece 146B. Alternatively, the bottom rudder 112 may form part of either the right piece 146A or the left piece 146B. If present, the side wall 130, dividing wall 132, and rear wall 134, each of the sub-chamber 120, may also form part of each of the right piece 146A and left piece 146B.

The right piece 146A and left piece 146B may be secured to each other by any means known in the art. In one embodiment, the right piece 146A and left piece 146B snap together at the seam 144 to create a water-tight junction. In another embodiment, the right piece 146A and left piece 146B meet at a gasket (not shown) positioned along the seam 144 to create a water-tight junction. In yet another embodiment, the right piece 146A and left piece 146B are glued or bonded together. In still another embodiment, the right piece 146A and left piece 146B are screwed together. In one embodiment, the right piece 146A and left piece 146B cannot be separated from each other after assembly.

The water-tight seam 144 may exclude water from the flotation chamber 100. The water-tight seam 144 may exclude water from the sub-chamber 120. The water-tight seam 144 may exclude water from the bottom rudder 112 in the embodiment in which the bottom rudder 112 forms part of the right piece 146A and the left piece 146B.

Operation of the Mechanized Trolling Device

The power source 140 is electrically coupled to the motive source such that when the Device is turned on, the power source provides power to the motive source, which results in operation of the thrust-induce source, such as rotation of an impeller/propeller.

The Device is propelled through the water by the combined action of the motive source and thrust-inducing source. The Device may travel through the water at various speeds. In one embodiment, the Device travels through the water at a speed of 12 mph or slower. In another embodiment, the Device travels through the water at a speed of 10 mph or slower. In another embodiment, the Device travels through the water at a speed of 8 mph or slower. In yet another embodiment, the Device travels through the water at a speed of 6 mph or slower. In still another embodiment, the Device travels through the water at a speed of 4 mph or slower. In a further embodiment, the Device travels through the water at a speed of 2 mph or slower.

In one embodiment, the Device travels through the water at a speed of 2 mph or faster. In another embodiment, the Device travels through the water at a speed of 4 mph or faster. In another embodiment, the Device travels through the water at a speed of 6 mph or faster. In yet another embodiment, the Device travels through the water at a speed of 8 mph or faster. In still another embodiment, the Device travels through the water at a speed of 10 mph or faster. In a further embodiment, the Device travels through the water at a speed of 12 mph or faster.

The Device travels through the water away from the user. In one embodiment, the motor 136 runs continuously such that the Device may travel as far as the user desires, up to the length of the attached fishing line. The user may adjust the Device distance and fishing distance by reeling in or letting out the fishing line.

In another embodiment, the Device is configured to automatically shut off power after a certain period of operation, such that the device travels for a distance before the motor 136 stops. In one embodiment, the Device travels 300-350 feet.

In one embodiment, the Device travels 100 feet or more. In another embodiment, the Device travels 200 feet or more. In another embodiment, the Device travels 300 feet or more. In yet another embodiment, the Device travels 350 feet or more. In still another embodiment, the Device travels 400 feet or more.

In one embodiment, the Device travels 400 feet or less. In another embodiment, the Device travels 350 feet or less. In another embodiment, the Device travels 300 feet or less. In yet another embodiment, the Device travels 200 feet or less. In still another embodiment, the Device travels 100 feet or less.

Use of the Mechanized Trolling Device

Figure 10A:
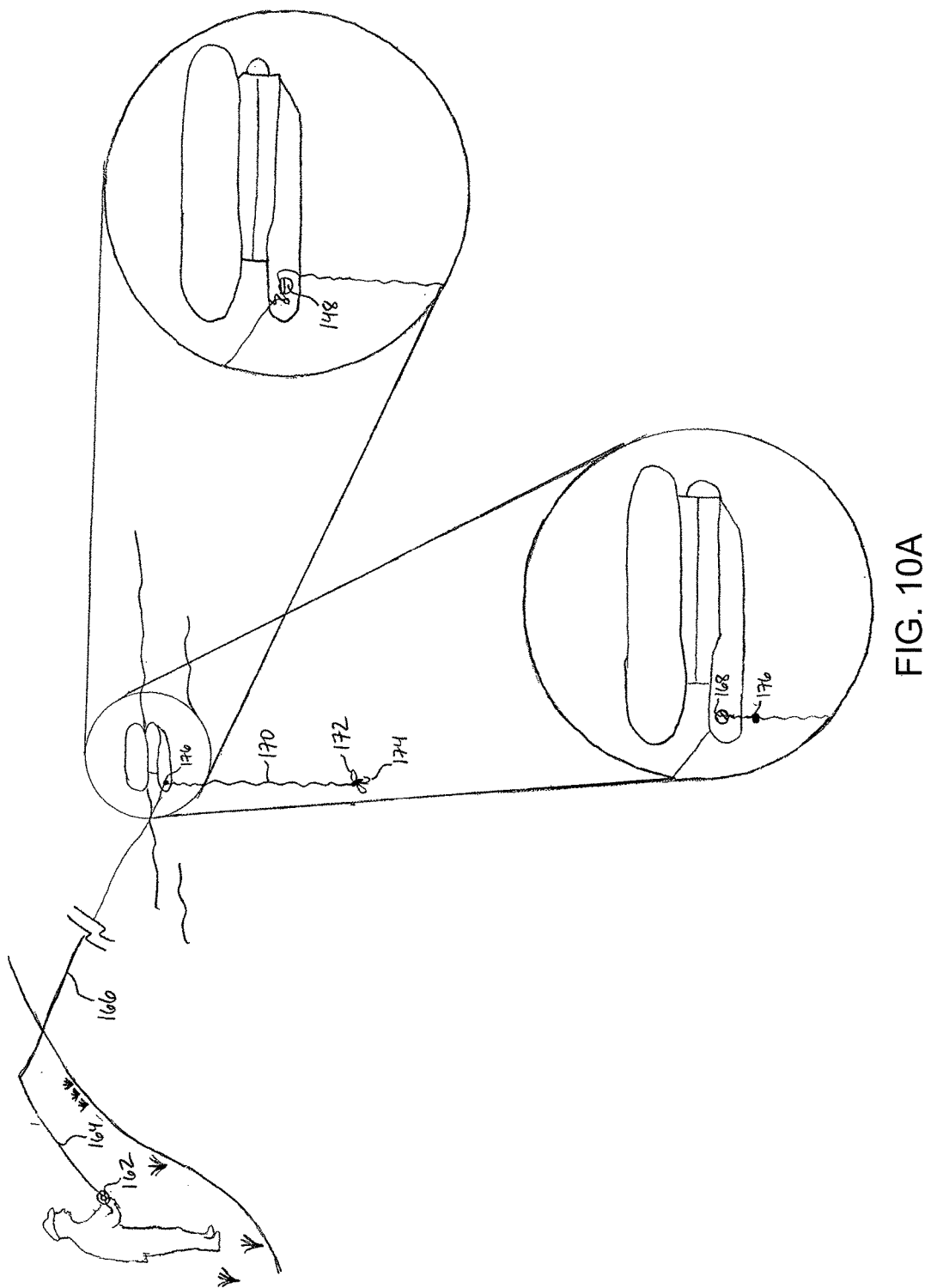
FIG. 10A is a schematic of the mechanized trolling device after having been deployed by a user.
Figure 10C:
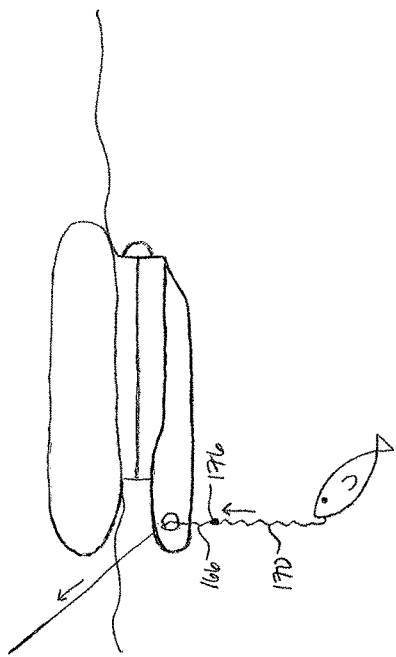
FIG. 10C is a schematic of reverse trolling the mechanized trolling device.
Figure 10B:
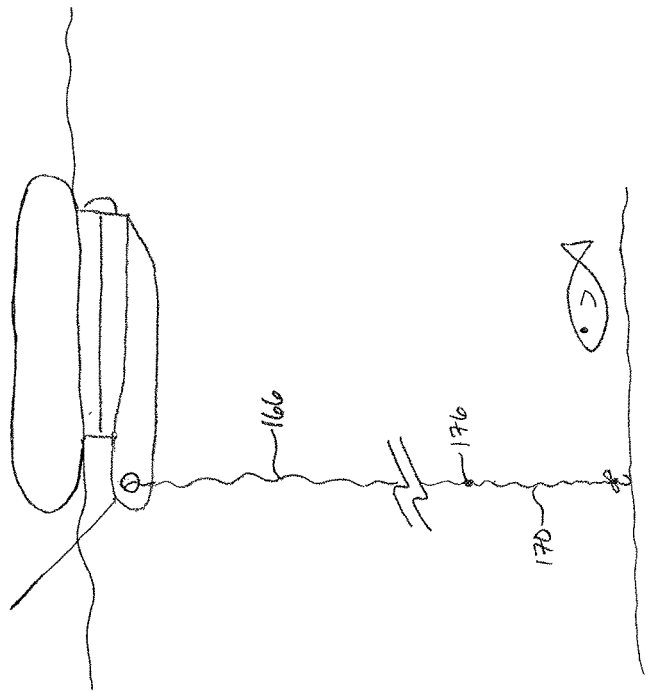
FIG. 10B is a schematic of the mechanized trolling device after its timed motor operation has been completed.

By way of example but not limitation, FIGS. 10A-10C (not to scale) illustrate one method of using the Device of FIGS. 1-6. A user prepares a leader line 170 as desired, which line can include one or more hooks 174 and/or bait 172. The bait 172 may be natural or artificial. The leader line 170 is secured to a fishing line 166 and the fishing line 166 is secured to a backing line. The fishing line 166 and backing line are rigged in a fishing rod 164 and reel 162 set-up. A weighted shot 176 is secured to the fishing line 166, close to the juncture with the leader line 170 but proximal to the fishing rod 164. The fishing line 166 is positioned through the line retainer 110. The fishing line 166 may be temporarily secured to the Device by placing the weighted shot 176 in the pocket 148. The fishing line 166 may be temporarily secured to the Device by electromagnetic closure of a carabineer-like line retainer 110.

The user turns on the Device by pressing the button 178. For a set period of time as controlled by the timer 180, the power source 140 provides power to the motor 136, which rotates the drive shaft 138, which rotates the impeller 126. The power source 140 may also simultaneously provide power to the electromagnet 168.

While standing on shore, the user casts the fishing line 166 with the attached leader line 170 and Device into the water. The Device lands in the water. The Device is propelled away from the user by the force of water moving into the water intake ports 116, through the sub-chamber 120, past the spinning impeller 126, and out the exit orifice 188.

The timer 180 runs for about 50 seconds during which time the motor 136 generates thrust such that the Device travels at about 4.5 mph. The Device travels about 300-350 feet. The fishing line 166 and leader line 170 have been carried along with the Device out into the water away from the user.

When the motor 136 stops, the current to the electromagnet 168 also stops, which releases the leader line 170. If the weighted shot 176 is in a pocket 148, the user briefly tugs on the fishing line 166 to release the weighted shot 176 from the pocket 148. The weight of the weighted shot 176 causes the fishing line 166 and leader line 170 to fall towards the bottom of the waterbed, as shown in FIG. 10B. The user then fishes at about the depth of the water near the spot at which the Device has come to rest.

A fish may bite the bait 172 on the leader line 170 and become hooked on the leader line 170. The user then reverse trolls the Device by reeling in the fishing line 166. As the fishing line 166 is reeled in, the leader line 170 is drawn up off the waterbed until the weighted shot 176 meets the Device, as shown in FIG. 10C. The user continues to reel in the fishing line 166, which draws the Device back to the user. The fish may then be removed from the leader line 170. The Device may then be used again.

The Device disclosed herein is compatible with any fishing line known in the art. Selection of fishing line may depend on the environment in which the Device is used and the expected weight of the fish to be caught. By way of example, but not limitation, braided (spider) line may be used. The braided line may be 50-pound line. The braided line may be used in conjunction with a lighter-weight line, such as a 15-pound monofilament. The heavier line may be used from the user to the Device, such as to the point at which weighted shot is attached. The lighter line may be used as a leader line, such as between weighted shot and one or more hooks. When stress is applied to the entire line, the lighter line is more likely to break while the heavier line remains intact and secured to the Device. This combination of lines confers the advantage of the user still being able to retrieve the Device by pulling on or reeling in the heavier line.

The Device disclosed herein may be used in any fishing environment. In one embodiment, the Device is used in fresh water. In another embodiment, the Device is used in salt water.

In one embodiment, the Device is deployed from shore for fishing at a distance of up to about 400 feet. In another embodiment, the Device is deployed from shore for fishing at a distance of up to about 2000 feet. In such an embodiment, the overall design of the Device, including the power source, motive source 136, and thrust-inducing source, is larger and/or more powerful. One advantage of using the Device for fishing at long distances from shore is that the user can catch larger and different fish than those present closer to shore.

In another embodiment, the Device is deployed from a boat, such as for deep sea fishing. One advantage of the Device for deep sea fishing is that the device itself moves, so the fishing boat would not have to constantly be under power.

In another embodiment, the Device is used for ice fishing. In such as embodiment, the flotation chamber 100 is smaller or is removed to permit the device to travel in water beneath a layer of ice.

CONCLUSION

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

The above specification, examples and data provide a complete description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A mechanized trolling device comprising:
    a flotation chamber comprising a forward end and a rearward end defining a length of the flotation chamber;
    a second chamber comprising:
        a forward end and a rearward end defining a length of the second chamber therebetween;
        a sub-chamber comprising a forward end and a rearward end defining a length of the sub-chamber, the sub-chamber positioned concentrically with respect to the second chamber along the length within the second chamber and secured to the second chamber by at least one positioning element extending radially between the sub-chamber and second chamber and extending along substantially an entirety of the length of the sub-chamber and an entirety of the length of the second chamber, the sub-chamber comprising:
            a power source, and
            a motor powered by the power source;
            wherein the forward end of the sub-chamber is located between the forward ends of the flotation chamber and the second chamber in an axial direction along the lengths of the flotation, second, and sub-chambers;
        an impeller driven by the motor;
        at least one water intake port with an inlet;
            the inlet positioned on an exterior of the device at a forward end of the second chamber; and
            the at least one water intake port positioned between the second chamber and the sub-chamber;
        a nozzle extending from the impeller to an exit orifice at a rearward end of the second chamber, the nozzle tapering from a widest diameter at the impeller to a narrowest diameter adjacent the exit orifice, the nozzle and exit orifice being in fluid communication with the at least one water intake port;
        wherein the nozzle comprises a right frustoconical section having a concave profile, and
    at least one rudder.

2. The device of claim 1, wherein the power source is a battery.

3. The device of claim 1, wherein the motor is a DC motor.

4. The device of claim 1, wherein the motor automatically shuts off after a set amount of time.

5. The device of claim 4, wherein the amount of time is controlled by a timer.

6. The device of claim 1, wherein the impeller is sheltered in the second chamber.

7. The device of claim 1, wherein the sub-chamber is water-tight.

8. The device of claim 1, wherein a drive shaft of the motor passes through water-excluding material.

9. The device of claim 1, further comprising a line retainer.

10. The device of claim 9, wherein the line retainer comprises an electromagnet.

11. The device of claim 1, wherein water flows between the sub-chamber and an inner wall of the second chamber when the device is in use.

12. The device of claim 1, wherein the at least one rudder further comprises at least three rudders.

13. The device of claim 1, wherein the sub-chamber extends a majority of the length of the second chamber and is configured to receive at least one AA battery.

14. The device of claim 1, wherein the sub-chamber extends for at least a length of a AAA battery within the second chamber.

15. The device of claim 1, wherein the at least one water intake port is positioned substantially at the forward end of the flotation chamber.

16. The device of claim 1, wherein the nozzle further comprises an unobstructed flow path from a widest diameter of the nozzle to a narrowest diameter of the nozzle.

17. A method for fishing with the device of claim 1 comprising:
    attaching a leader line with weighted shot to a fishing line;
    temporarily attaching the device to the fishing line;
    securing the leader line to the device;
    turning the device on;
    casting the line with the attached device into the water;
    letting the device travel through the water; and
    deploying the leader line and fishing line.

18. The method of claim 17, wherein the device travels until it automatically shuts off.

19. The method of claim 17, wherein the leader line and fishing line are deployed to a depth of the water near the device.

20. The method of claim 17, further comprising recapturing the device by reeling it back in.

* * * * *